(12) United States Patent
Gazzard (10) Patent No.: US 8,191,116 B1
(45) Date of Patent: May 29, 2012

(54) USER EQUIPMENT VALIDATION IN AN IP NETWORK

(75) Inventor: Daryl Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1184 days.

(21) Appl. No.: 11/252,077

(22) Filed: Oct. 17, 2005

Related U.S. Application Data (60) Provisional application No. 60/712,230, filed on Aug. 29, 2005.

(51) Int. Cl.
*G06F 15/16* (2006.01)
*G06F 7/04* (2006.01)

(52) U.S. Cl. ............. 726/4; 726/5; 726/6; 726/7; 726/8; 726/9; 726/10; 726/11; 726/12; 726/13; 726/14; 726/15

(58) Field of Classification Search .................. None
See application file for complete search history.

(56) References Cited

U.S. PATENT DOCUMENTS

| | | | |
|---|---|---|---|
| 5,303,285 A | 4/1994 | Kerihuel et al. | |
| 5,335,278 A | 8/1994 | Matchett et al. | |
| 5,353,331 A | 10/1994 | Emery et al. | |
| 5,392,458 A | 2/1995 | Sasuta et al. | |
| 5,754,952 A | 5/1998 | Hodges et al. | |
| 6,061,558 A | 5/2000 | Kennedy, III | |
| 6,490,443 B1 | 12/2002 | Freeny, Jr. | |
| 6,650,888 B1 | 11/2003 | Cook | |
| 6,769,000 B1 | 7/2004 | Akhtar et al. | |
| 7,610,619 B2 * | 10/2009 | Kastelewicz et al. | 726/10 |
| 2002/0006780 A1 * | 1/2002 | Bjelland et al. | 455/406 |
| 2002/0078153 A1 * | 6/2002 | Chung et al. | 709/204 |
| 2002/0191597 A1 * | 12/2002 | Lundstrom | 370/356 |
| 2003/0154400 A1 * | 8/2003 | Pirttimaa et al. | 713/201 |
| 2004/0073686 A1 * | 4/2004 | Hurta | 709/229 |
| 2004/0153667 A1 * | 8/2004 | Kastelewicz et al. | 713/201 |
| 2005/0096012 A1 * | 5/2005 | Borella et al. | 455/411 |
| 2005/0097363 A1 * | 5/2005 | Bajko et al. | 713/201 |
| 2005/0131989 A1 * | 6/2005 | Beckmann et al. | 709/201 |
| 2005/0198534 A1 | 9/2005 | Matta et al. | |
| 2008/0198845 A1 * | 8/2008 | Boman | 370/389 |

* cited by examiner

*Primary Examiner* — Matthew Henning
(74) *Attorney, Agent, or Firm* — Turocy & Watson, LLP (57) ABSTRACT

An authentication and validation architecture utilizing a P-CSCF (proxy-call session control function) service to validate a source IP address against a registered contact IP address upon receiving an initial request for a dialog or a standalone request (except REGISTER) from a registered user. This provides a security measure to prevent IMS (IP multiemdia subsytem) identity spoofing, when SIP security (IPsec) access security is not enabled, or not used, between the user equipment (UE) and P-CSCF service.

21 Claims, 7 Drawing Sheets

USER EQUIPMENT VALIDATION IN AN IP NETWORK

CROSS-REFERENCE TO RELATED APPLICATION

This application claims the benefit of U.S. Provisional Patent Application Ser. No. 60/712,230, filed on Aug. 29, 2005, and entitled USER EQUIPMENT VALIDATION IN AN IP NETWORK. The entirety of this application is incorporated herein by reference.

BACKGROUND

The Third Generation Partnership Project (3GPP) specifications define a mechanism that provides signaling integrity for SIP (session initiation protocol) signaling between the IP multimedia subsystem (IMS) (P-CSCF) and the user equipment (UE). Signaling integrity prevents identity spoofing, man-in-the-middle attacks, etc.

The IMS represents a 3GPP and 3GPP2 effort to define an all-IP based wireless network as a replacement for the disparate voice, data, signaling, and control network elements, and enables the support for IP multimedia applications within the UMTS (Universal Mobile Telecommunications System). The UMTS is a 3G broadband packet-based transmission of text, digitized voice, video, and multimedia that offers a consistent set of services to mobile computer and phone users no matter where they are located in the world.

The telecom industry is currently shifting towards all-IP systems, driven by the fundamental need to reduce costs, create new revenue generating services and to protect the operator business model, and IMS is a new core and service domain that enables the convergence of data, speech and network technology over an IP-based infrastructure. It is the operator choice of control and service logic for IP packet-based communication. For users, IMS-based services enable communications in a variety of modes that include voice, text, pictures and video, or any combination thereof in a highly personalized and secure way. IMS is designed to fill the gap between the existing traditional telecommunications technology and Internet technology that increased bandwidth alone does not provide, and allows operators to offer new, innovative services that share holders and end users are expecting.

In release 5 of the 3GPP specifications, the IMS has been specified to be access independent. This means that the access technology used to transport user SIP messages to the IMS network does not impact the functionality of the IMS network itself. Consequently, any access can be used such as DSL (digital subscriber line), cable modem, WLAN (wireless LAN), and GPRS (general packet radio service), for example. Access independence supports major efforts to converge network architectures.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention disclosed and claimed herein, in one aspect thereof, comprises an authentication and validation solution wherein a P-CSCF (proxy-call session control function) server is utilized to validate a source IP address against a registered contact IP address upon receiving an initial request for a dialog or a standalone request (except REGISTER) from a registered user. The subject invention is provided as a security measure to prevent IMS (IP multimedia subsytem) identity spoofing, when SIP security (IPsec) access security (per 3GPP TS 33.203) is not enabled, or not used, between the user equipment (UE) and P-CSCF service.

Accordingly, upon successfully authenticated registration (using authentication and key agreement (AKA) protocol), the P-CSCF stores the registered contact information. Upon receiving an initial request for a dialog or a standalone request (except REGISTER), the P-CSCF validates the source IP address against the registered contact IP address for the origination party. If the two match, the P-CSCF proceeds with serving the request. If the two do not match, or the registered contact is not an IP address, the P-CSCF rejects the request (e.g., with a 403 response).

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
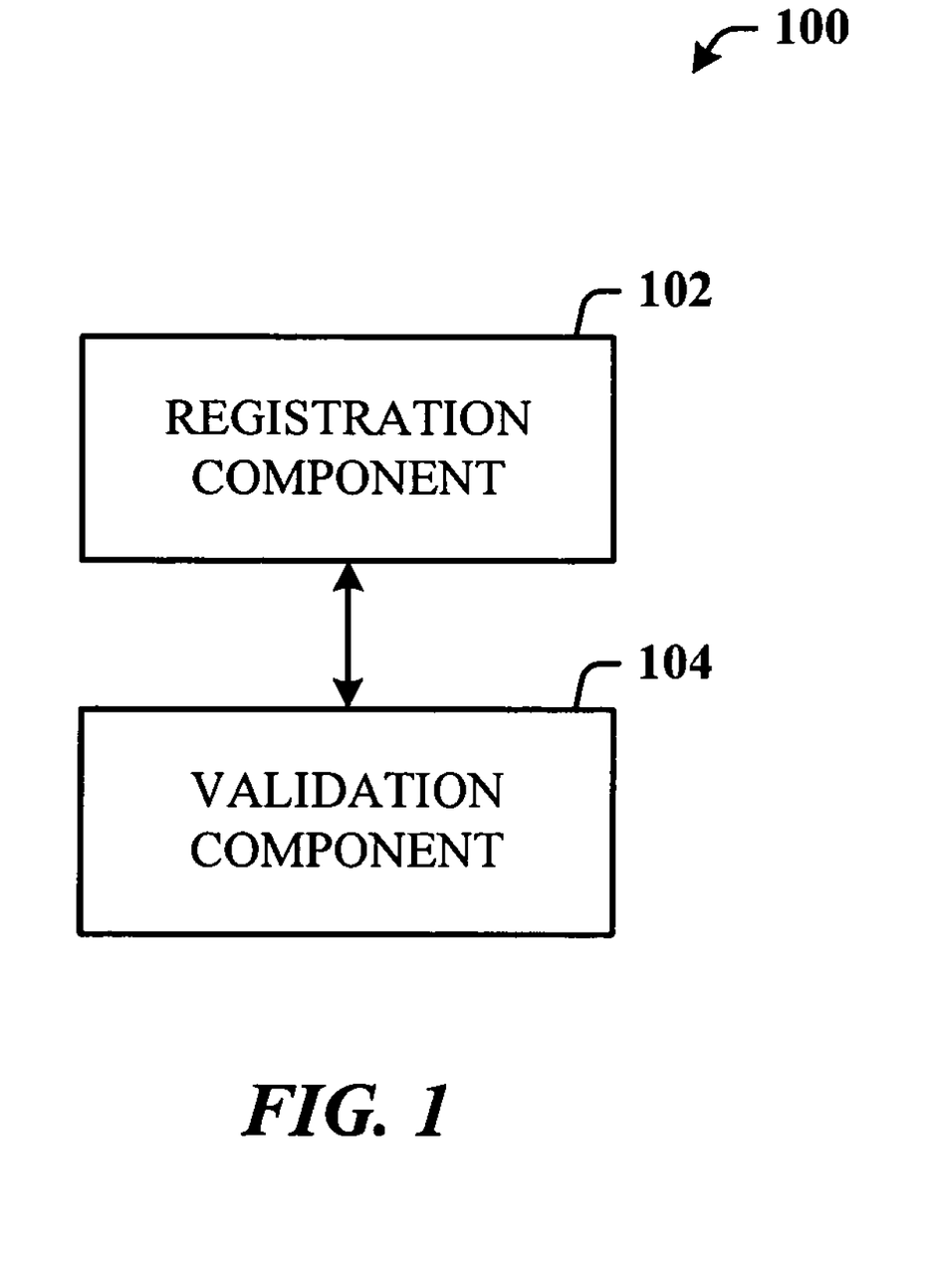
FIG. 1 illustrates a system that facilitates validation of a mobile user (or user equipment (UE)) according to a disclosed innovated aspect.

Referring initially to the drawings, FIG. 1 illustrates a system 100 that facilitates validation of a mobile user (or user equipment (UE) as used herein) according to a disclosed innovated aspect. The system 100 can include a registration component 102 that facilitates authenticated registration (e.g., via authentication and key agreement-(AKA)), and thereafter facilitates storage of a registered contact IP address or registered contact information associated with the mobile user. In one implementation, the registered contact information can be stored in a proxy-call session control function (P-CSCF) server. Such a server can be associated with an IMS (IP multimedia subsystem) system.

The system 100 can also include a validation component 104 that receives a request and validates the request against the registered contact information to obtain validation results. If the results are favorable, the server proceeds with serving the request. Otherwise, the server rejects the request and issues a notification (e.g., a 403 response).

IPsec access security related to the subject innovation can be referenced according to a 3GPP Technical Specification 33.203, the entirety of which is incorporated by reference herein.

In one innovative aspect, it is assumed that source IP address spoofing is prevented from a GGSN (gateway GPRS support node), that AKA authentication is performed between UE and S-CSCF (serving CSCF), IPsec access security is not enabled between UE and P-CSCF, and the UE will register an IP address (e.g., IPv4).

Figure 2:
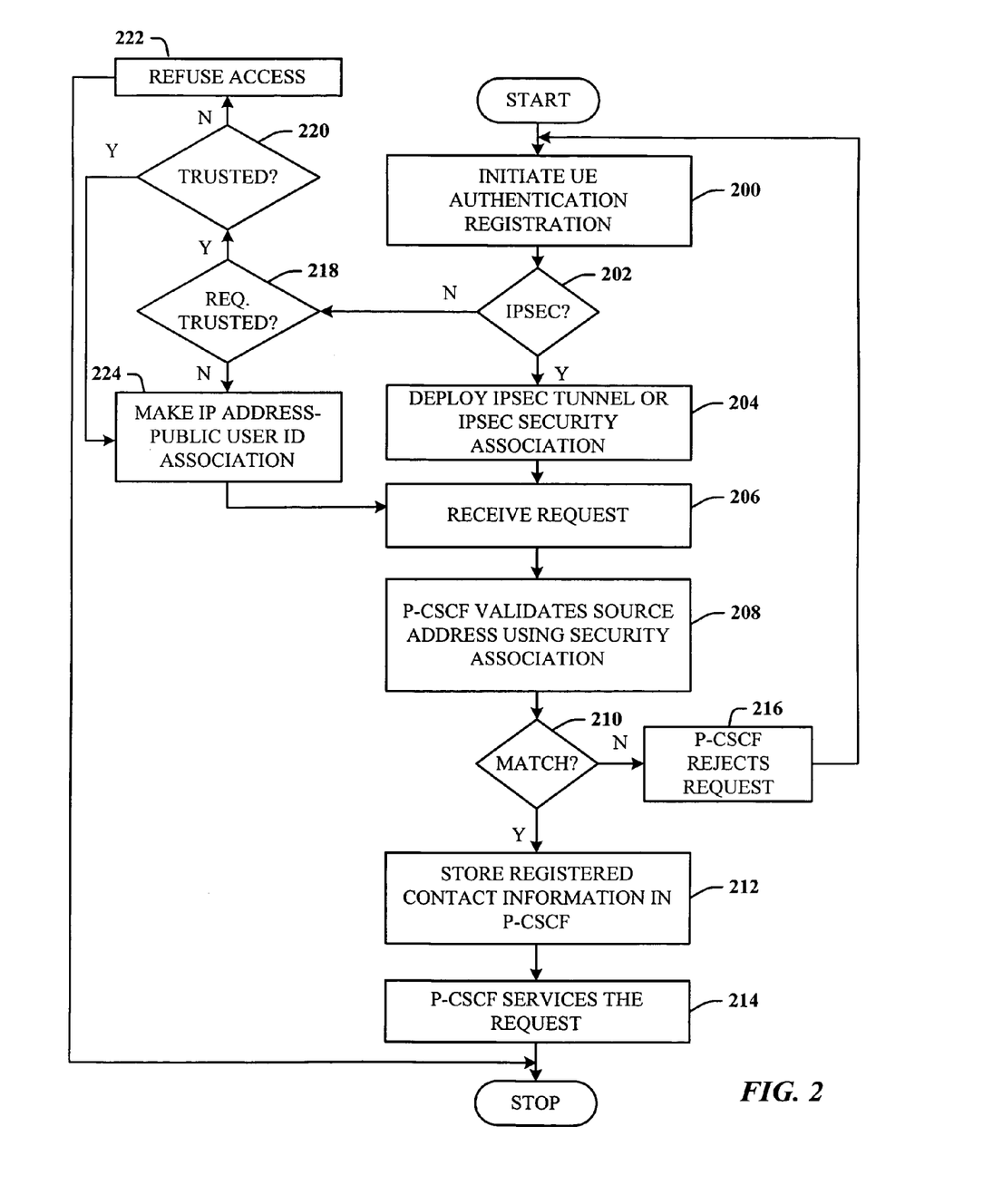
FIG. 2 illustrates a methodology of validating user equipment according to an aspect.

FIG. 2 illustrates a methodology of validating user equipment according to an aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, UE authenticated registration (e.g., AKA) is initiated. At 202, the system determines if the UE supports IPsec. If so, flow continues to 204 to employ an IPsec UE/P-CSCF tunnel or IPSec security association. At 206, a request is received for processing, such as a dialog request or a standalone request, for example. At 208, the server (e.g., P-CSCF) validates the request (either source address with registered address or IPSec security association). At 210, the system determines if there is a match (or favorable results). If so, flow is to 212 to store the registered contact information in the P-CSCF. At 214, the system services the request. Alternatively, if the match is unfavorable, flow is from 210 to 216 where the P-CSCF server rejects the request and issues a suitable notification. Flow then proceeds back to 200 to process the next validation.

Further consideration can be provided as to whether the access network of the user is required to be "trusted" for access without IPsec. That is, the innovative architecture acknowledges that IP address spoofing can be prevented by the network. This could be achieved by Remote Authentication Dial in User Service (RADIUS) accounting from the network or a policy database dip that takes the IP address allocated into account. This is processed by considering that if the UE does not support IPsec and is accessing from a trusted network, then a IP address and public user ID association can be made. If the UE is in an untrusted network and does not support IPsec, then access is refused. Accordingly, at 202, if the UE does not accept IPsec, flow is to 218 to further consider if the network requires a trusted network without IPsec. If so, at 220, the system determines if it is a trusted network. If not, flow is to 222 to refuse network access. Note that if the network is not to be trusted, other mechanisms can be employed that ensure IP address spoofing can not occur or make the association and use validate requests. If IPsec is not supported, and if the network is required to be trusted and is trusted, flow is from 220 to 224 to make an IP address-public user ID association. Flow then continues from 224 to 206 to receive the request, and process the request as described previously.

Alternatively, if the UE does not support IPsec, and the system does not require a trusted network, flow is from 218 to 224 to make the IP address-public user ID association. Flow then continues from 224 to 206 to receive the request, and process the request as described previously.

Figure 3:
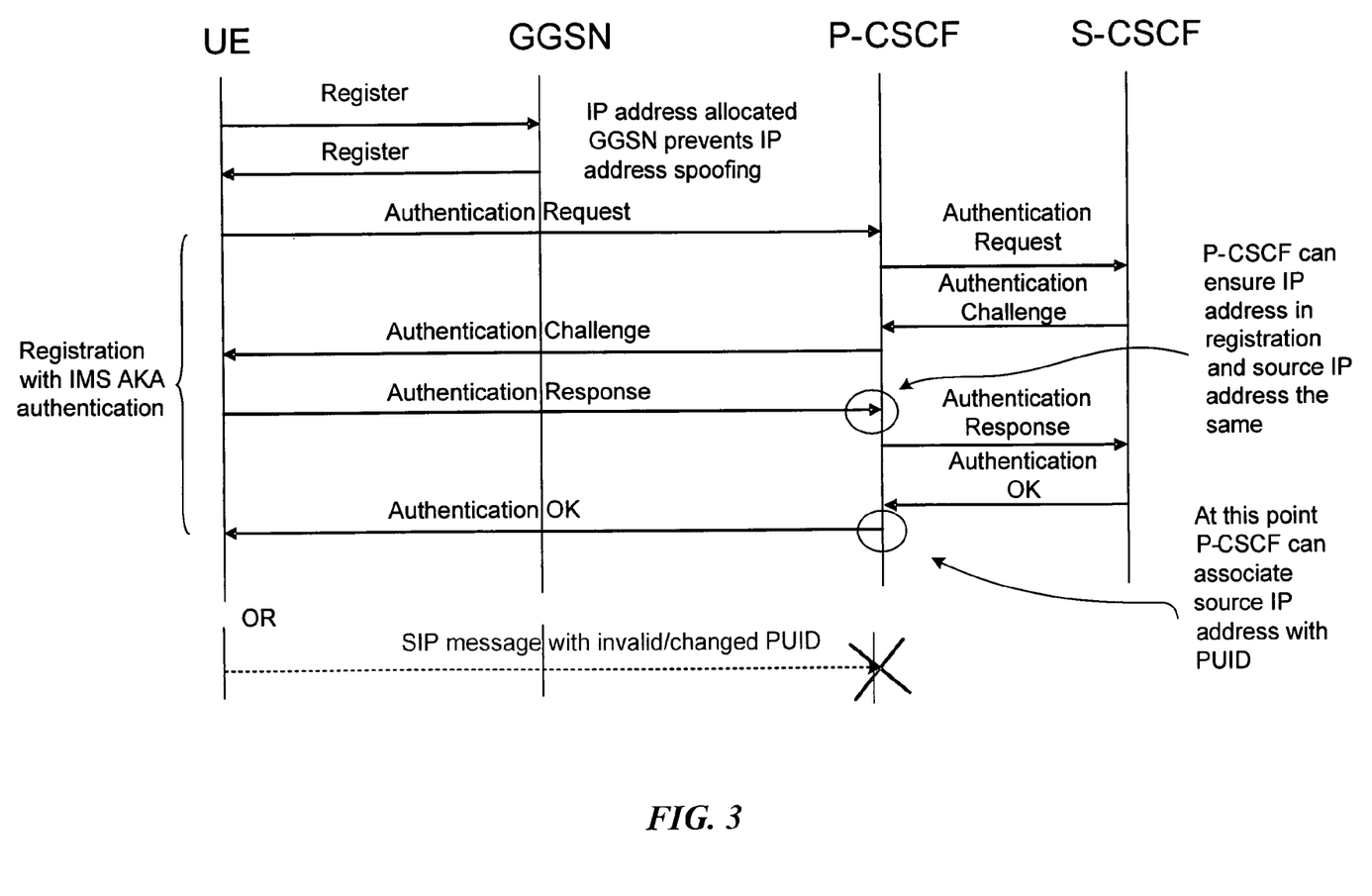
FIG. 3 illustrates a call flow diagram of the signal and data interchange between various entities of a 3G network in accordance with another aspect.

Referring now to FIG. 3, there is illustrated a call flow diagram of the signal and data interchange between various entities of a 3G network in accordance with another aspect. Initially, the UE communicates to the GGSN such that an IP address is allocated via the GGSN as a means of preventing IP address spoofing. The GGSN then communicates the IP address back to the UE. Next, IMS AKA authenticated registration is initiated for an IMS subscriber accessing through UMTS. The security parameters (e.g., keys) are generated by the IMS AKA scheme and transported by SIP (session initiation protocol). IMS AKA begins by the UE registering (via a SIP REGISTER message) with the P-CSCF service, which then communicates the registration message with the S-CSCF. The S-CSCF responds back to the UE with a challenge message (AUTH_CHALLENGE) via the P-CSCF. The UE responds to the challenge message of the S-CSCF with a registration message that includes the requested information, via the P-CSCF.

The UE processes information in the challenge message and computes a challenge response message, which is then sent back to the P-CSCF registrar. Once the response reaches the P-CSCF, the P-CSCF can ensure that the IP address in the registration (authentication response) message and the source IP address are the same. If not, the request is rejected. If valid, authentication continues by forwarding the challenge response to the S-CSCF. The P-CSCF then receives the validation results from the S-CSCF and stores the registration contact IP address. At this point, the P-CSCF can associate the source IP address with a PUID (personal unique identification). The P-CSCF then sends back an authentication acceptance message (Auth_OK) to the UE. If during a re-registration process, the UE sends a SIP message with an invalid or changed PUID to the P-CSCF, the P-CSCF is now capable of determining that the PUID is false or spoofed and can stop further communications with the UE.

Figure 4:
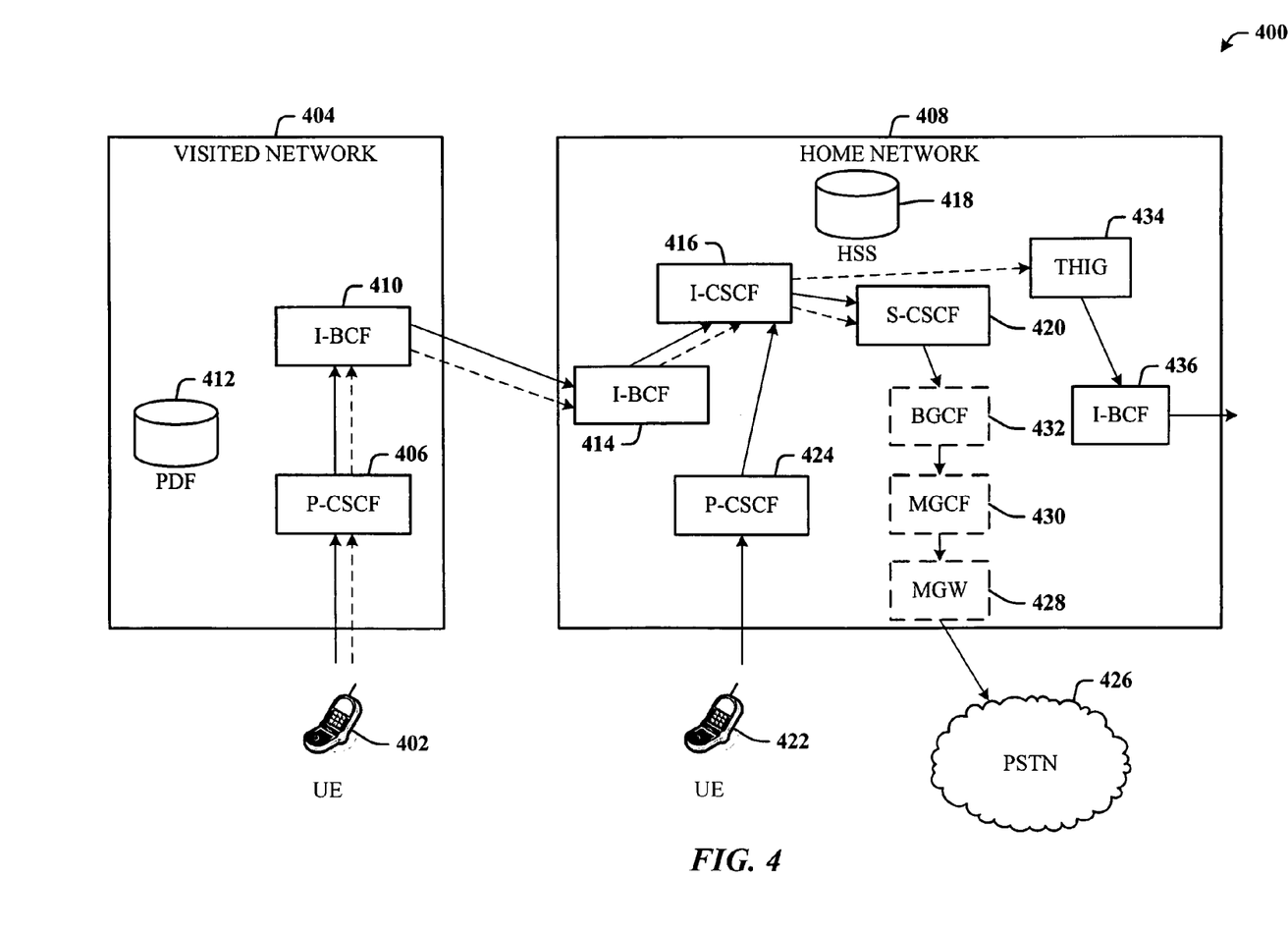
FIG. 4 illustrates an examplary IMS system that facilitates authentication and validation in accordance with the subject invention.

FIG. 4 illustrates an examplary IMS system 400 that facilitates authentication and validation in accordance with the subject invention. A user initiates a call via user equipment (UE) to a visited network 404. A registration process is initiated to the visited network 404 at a P-CSCF 406. The P-CSCF entity is the first point of contact within the IMS for a UE. The P-CSCF is in the position to detect services which should be hosted by the visited network 404. This is important not only in terms of content services but also in the provision of emergency call handling and lawful intercept. As illustrated, a P-CSCF can be located in the visited network 404 or a home network 408. A function of the P-CSCF is to ensure that registration of the user is forwarded to the correct home network. The P-CSCF also can provide defense against SIP signaling attack. The P-CSCF ensures that SIP messages are passed to the correct S-CSCF once registration has occurred. Contact with other networks during registration and initial SIP session set up is through an I-CSCF (interrogating CSCF).

The visited network 404 includes an I-BCF (interconnect border control function) entity 410. The I-BCF 410 was introduced by TISPAN (Telecoms & Internet converged Services & Protocols for Advanced Networks), a standardization body that focuses on fixed networks and Internet convergence, to formalize interconnects between networks. Functions of the I-BCF include the provision of NAPT (network address port translation) and firewall traversal for signaling, policing of signaling, topology hiding and conversion between IPv4 and IPv6. While 3GPP networks are IPv6 only, 3GPP2 and wireline evolutions can be to be a mixture of IPv4 and IPv6. The I-BCF can also control media exchanged across an operator boundary, controlling media pinhole establishment, policing, and dynamic NAPT and firewall traversal.

The visited network can also include a PDF (Policy Decision Function) entity 412. Also known as Service Based Policy Decision Function in TISPAN, this function takes a service level policy request from the application layer (for example P-CSCF) and translates it into IP QoS (quality-of-service) parameters. In GPRS networks, the PDF 412 can use a Go interface to set the policing policy for a session in the GGSN. In other networks, the PDF contacts a Border Gateway Function (BGF) entity to enforce the policy.

Note that GGSNs are not SIP session aware, and hence, GGSNs can only police on PDF sessions. SIP expects sessions to be able to handle multiple media simultaneously. However, this is not the case. Accordingly, 3GPP defines an additional parameter that forces the session to set up a new PDF context for each new media stream in the session. BCF is controlled by the P-CSCF, and for each media component, a new media pinhole is opened. Policing can therefore occur on a per-media component basis. This will allow the operator to ensure that the codecs and policy negotiated at the SIP layer is actually that which is sent by the user, and if not then it will be throttled or discarded.

The visited network I-BCF entity 410 interfaces to a home network I-BCF entity 414 that serves a similar function as the visited I-BCF network entity 410. The home network I-BCF 414 interfaces to an I-CSCF entity 416. The I-CSCF 416 is a function within the home network 408 that is able to determine the S-CSCF 420 to which a user should register. The S-CSCF is the function that registers the user and provides service to the users (even though these services may be on separate application platforms). The S-CSCF is an entity whose function is central to the IMS. The S-CSCF performs routing, translation, provides billing information to mediation systems, maintains session timers, interrogates the HSS to retrieve authorization, service triggering information and a user profile.

In order to determine the appropriate S-CSCF, the I-CSCF queries a home subscriber server (HSS) 418 that checks if the user is allowed to register in the originating network, and returns an S-CSCF name and capability, if this is the case. The I-CSCF 416 is then able to contact the S-CSCF 420 with the register.

The HSS 418 is the database of all subscriber and service data. Parameters can include user identity, allocated S-CSCF name, roaming profile, authentication parameters and finally service information. The HSS 418 also can provide traditional Home Location Register (HLR) and Authentication Centre (AuC) functions. The HSS 418 allows a user to access the packet domain (PD) and circuit domain (CD) of the network in the first place, via IMSI (international mobile subscriber identity) authentication. The above is wireless-based; however, in wireline networks, the access network is likely to use an AAA server to authorize the user. Note that a second UE 422 can also access the home network 408 directly via a home P-CSCF 424, and then to the home network I-CSCF entity 416.

The home network 408 can interface to a PSTN (public switched telephone network) 426, a circuit-switched (CS) network. For signaling, CS networks use ISUP (ISDN user part) (or BICC-bearer independent call control) over MTP (message transfer part), while IMS uses SIP. For media, CS networks use PCM (pulse code modulation), while IMS uses RTP (realtime transport protocol). A number of ingress/egress entities are provided in the home network 408 to allow internetworking with the PSTN 426. For example, a media gateway (MGW) 428 provides a physical conversion between TDM (time division multiplex) and IF for media. The MGW 428 interfaces to an MGCF (media gateway controller function) entity 430, which performs call control protocol conversion between SIP and ISUP. Additionally, the MGCF 430 interfaces to a signaling gateway (SGW) over SCTP (stream control transmission protocol), and controls resources in an MGW. An SGW can provide translation at the transport layer between SS7 (Signaling System 7) on MTP (TDM networks) and SS7 on SCTP (IP networks).

The MGCF entity 430 interfaces to a breakout gateway control function (BGCF) entity 432. The BGCF 432 is a SIP server that includes routing functionality based on telephone numbers, and is used when calling from the IMS to a telephone in a CS network, such as the PSTN 426 or a PLMN (public land mobile network) (not shown). The BGCF entity 432 decides whether PSTN breakout will occur in the current home network 408, or whether the SIP-I (ISUP over SIP) will first be sent to another IP network before breaking out. If the former, then the signaling is passed to an MGC (media gateway controller) to then allocate a port on the MGW for breakout. If the latter, the signaling is passed across the I-BCF to another BGCF in the breakout network.

The I-CSCF entity 416 can interface to a THIG (topology hiding internetwork gateway) entity 434. The THIG entity 434 interfaces to an outgoing I-BCF entity 436. Note in the above description, only some of the main functions have been described.

Call registration can occur from the first UE 402 through the P-CSCF 406, the I-BCF 410 and 424, to the I-CSCF 416 and the S-CSCF 420. Similarly, from the second UE 422, call registration occurs through the second P-CSCF 424 to the I-CSCF 416 and then to the S-CSCF 420. Call set up can occur from the first UE 402 through the P-CSCF 406, the I-BCF 410 and 414, to the I-CSCF 416 and S-CSCF 420, the THIG entity 434 and the outgoing I-BCF 436. Alternatively, if connecting to the PSTN 426, the call setup from the first UE 402 can take the same route to the S-CSCF 420, but then depart through the ingress/egress entities BGCF 432, MGCF 430 and MGW 428 to the PSTN 426.

Figure 5:
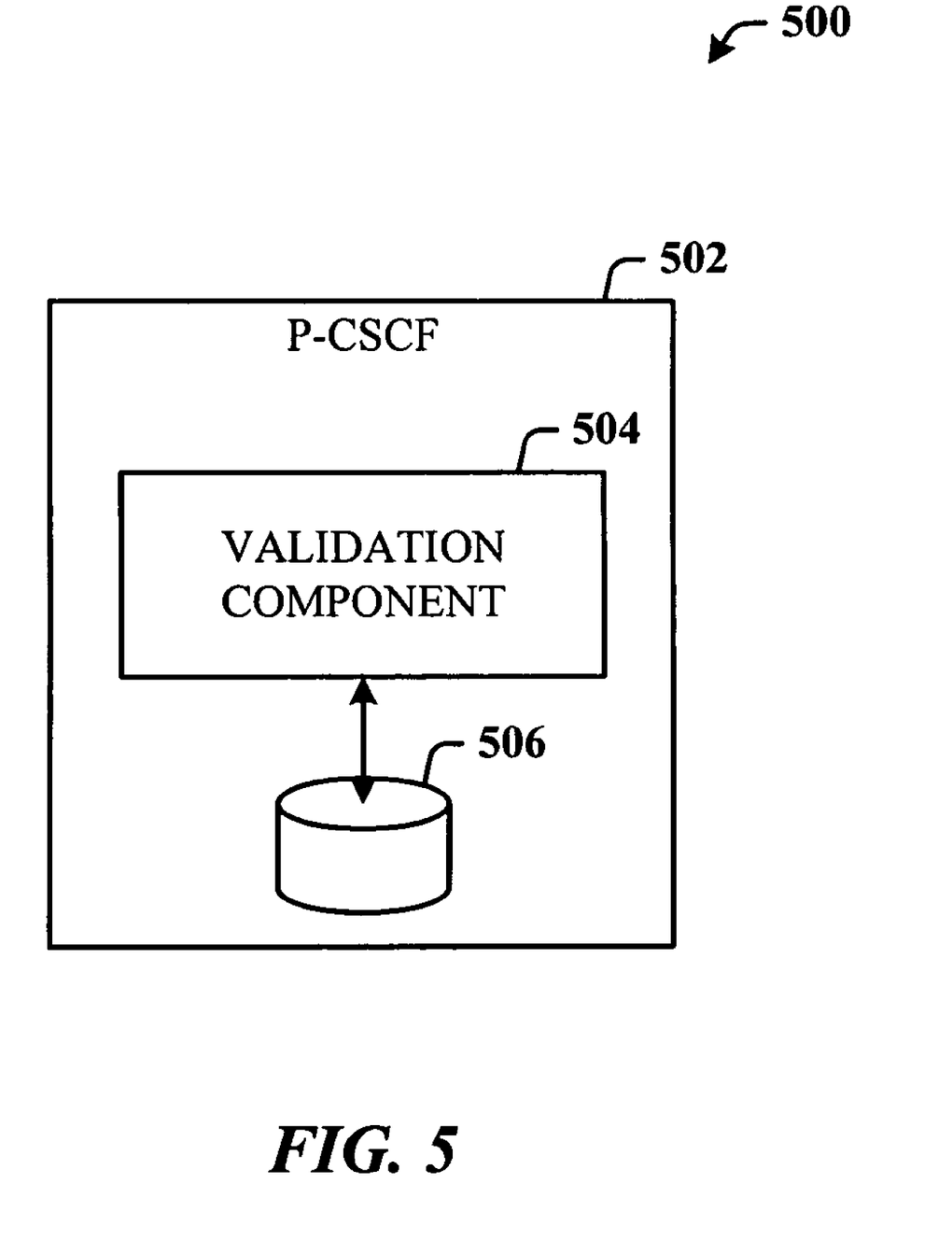
FIG. 5 illustrates a system where a P-CSCF is utilized to perform security processes in accordance with the disclosed innovation.

FIG. 5 illustrates a system 500 where a P-CSCF 502 is utilized to perform security processes in accordance with the disclosed innovation. Here, the P-CSCF 502 includes a validation component 504 that facilitates validation of a request against registered contact information that can be stored in a validation database 506.

Figure 6:
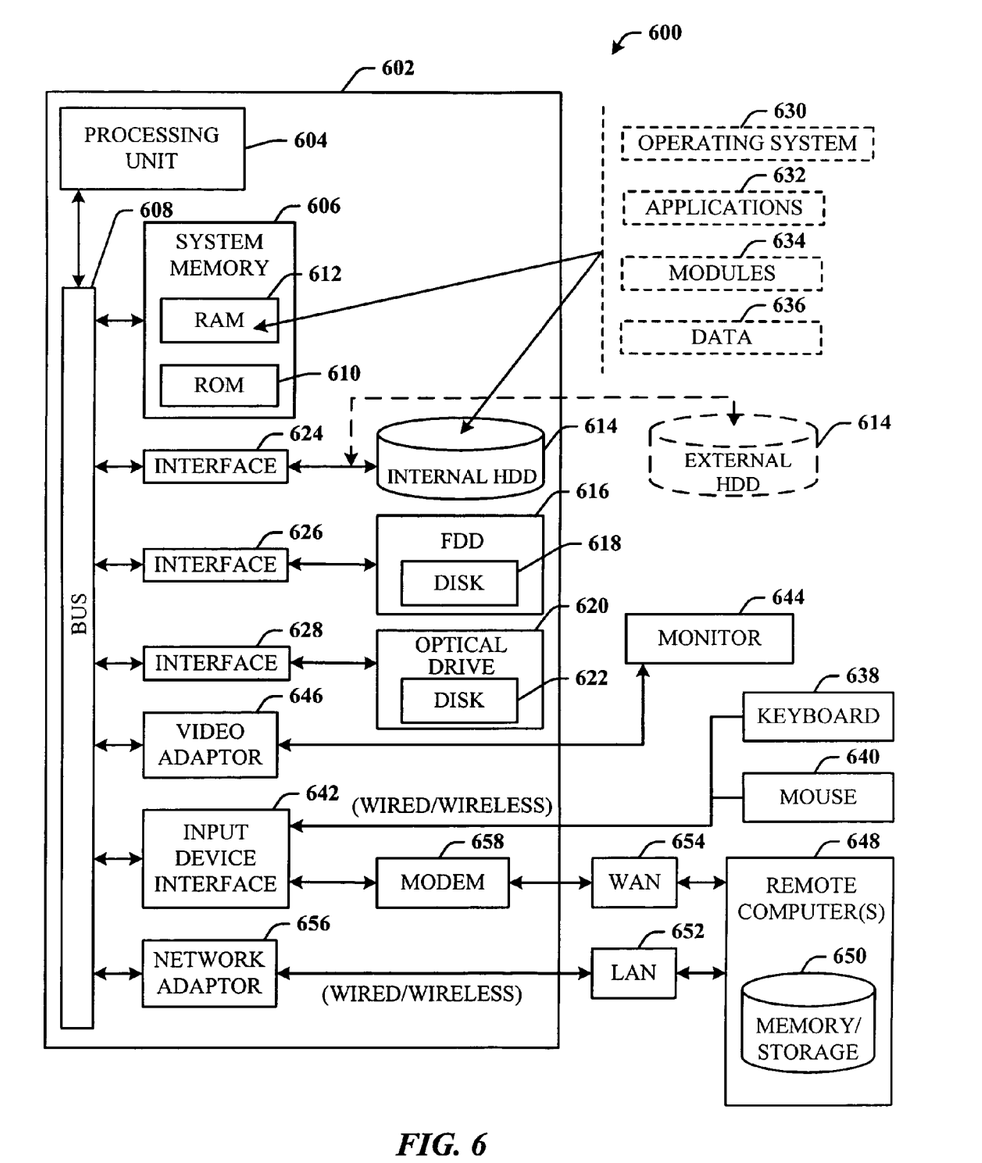
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects thereof, FIG. 6 and the following discussion are intended to provide a brief, general description of a suitable computing environment 600 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 612, including an operating system 630, one or more application programs 632, other program modules 634 and program data 636. All or portions of the operating system, applications, modules, and/or data can also be cached in the RAM 612. It is to be appreciated that the innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WI-FI (IEEE 802.11 wireless network) and BLUETOOTH short range wireless network wireless technologies. Thus, the communication can be a predefined structure as with a conventional network or simply an ad hoc communication between at least two devices.

WI-FI (IEEE 802.11 wireless network), or Wireless Fidelity, allows connection to the Internet from a couch at home, a bed in a hotel room, or a conference room at work, without wires. WI-FI (IEEE 802.11 wireless network) is a wireless technology similar to that used in a cell phone that enables such devices, e.g., computers, to send and receive data indoors and out; anywhere within the range of a base station. WI-FI (IEEE 802.11 wireless network) networks use radio technologies called IEEE 802.11(a, b, g, etc.) to provide secure, reliable, fast wireless connectivity. A WI-FI (IEEE 802.11 wireless network) network can be used to connect computers to each other, to the Internet, and to wired networks (which use IEEE 802.3 or Ethernet). WI-FI (IEEE 802.11 wireless network) networks operate in the unlicensed 2.4 and 5 GHz radio bands, at an 11 Mbps (802.11a/b) or 54 Mbps (802.11g) data rate, for example, or with products that contain both bands (dual band), so the networks can provide real-world performance similar to the basic 10BaseT wired Ethernet networks used in many offices.

Figure 7:
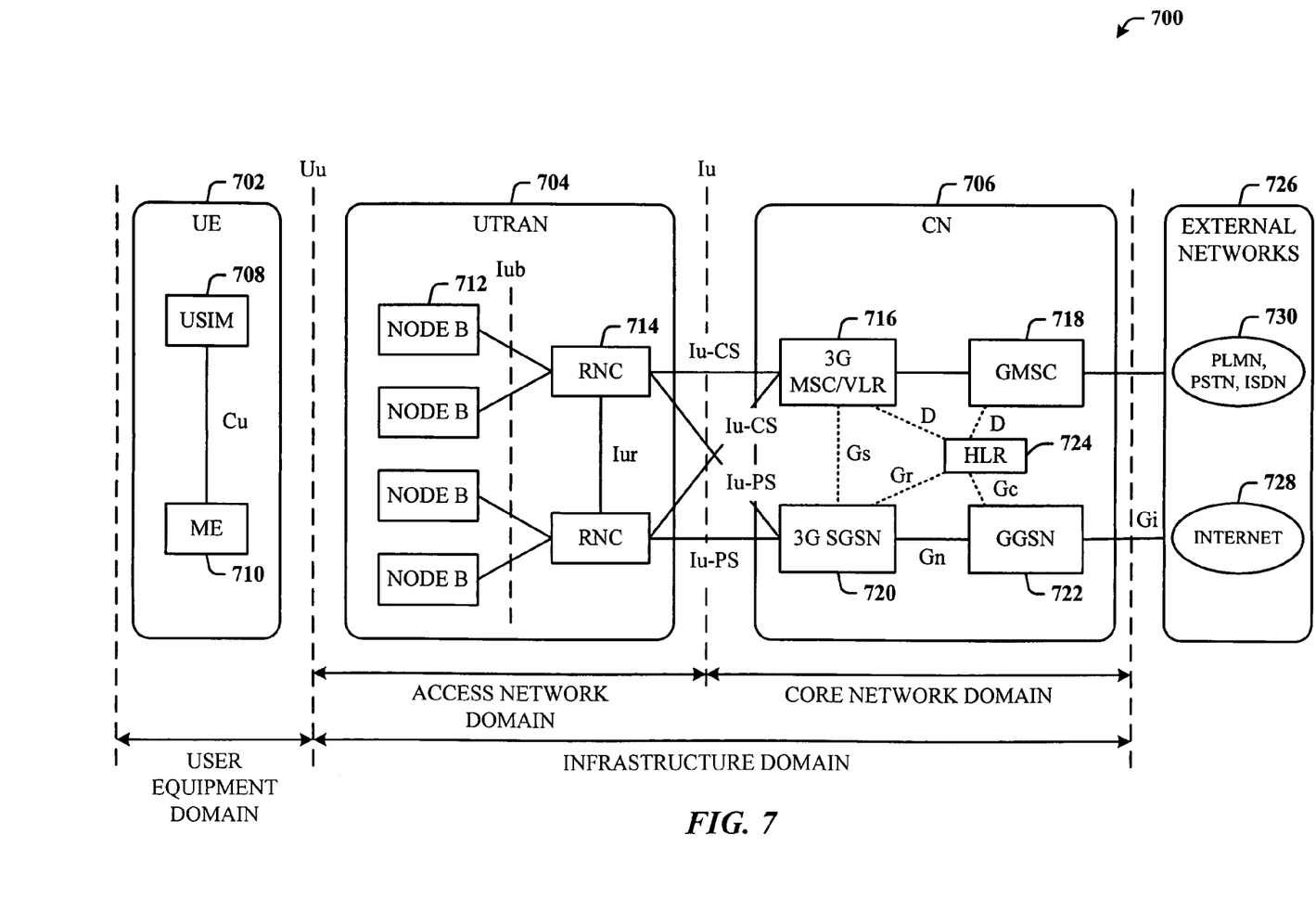
FIG. 7 illustrates an exemplary UMTS network that facilitates carrier management in accordance with the subject innovation.

FIG. 7 illustrates an exemplary UMTS network 700 that facilitates carrier management in accordance with the subject innovation. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 700 can consist of three interacting domains; a user equipment (UE) domain 702, a UMTS Terrestrial Radio Access Network (UTRAN) domain 704, and a core network (CN) domain 706. The UTRAN domain 704 is also referred to as the access network domain and the CN 706 is referred to as the core network domain, the both of which comprise an infrastructure domain.

The UE domain 702 includes a USIM (user services identity module) domain and an ME (mobile equipment) domain. User equipment is the equipment used by the user to access UMTS services. In the UE domain 702, the UMTS IC card is the USIM 708 which has the same physical characteristics as GSM SIM (subscriber identity module) card. The USIM interfaces to ME 710 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 704 provides the air interface access method for the UE domain 702. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 712, and control equipment for Node-B devices is called a radio network controller (RNC) 714. The interface between the Node-B device and the RNC 714 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains. Some of the circuit-switched elements are a mobile services switching center (MSC) and visitor location register (VLR) 716 and gateway MSC (GMSC) 718. Packet-switched elements include a serving GPRS support node (SGSN) 720 and gateway GPRS support node (GGSN) 722. Some network elements such as an EIR (equipment identity register) (not shown), HLR (home location register) 724, VLR and AuC (authentication center) (not shown) can be shared by both domains.

A function of the CN 702 is to provide switching, routing and transit for user traffic. The CN 702 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 706 interfaces to the radio access domain via an Iu interface. An Iu-CS (circuit-switched) reference point interfaces an RNC of the access network to the MSC/VLR entity 716 of the CN 706 for voice from/to the MSC/VLR 716. An Iu-PS (packet-switched) reference point interfaces an RNC of the access network to the SGSN entity 720 of the CN 706 for data from/to the SGSN 720.

In the CN 706, a Gs interface is provided between the MSC/VLR 716 and the SGSN. A Gn interface is provided between the SGSN 720 and the GGSN 722. A D interface is provided between the MSC/VLR 716 and the HLR 724, and the HLR 724 and the GMSC 718. A Gr interface is provided between the SGSN 720 and the HLR 724. A Gc interface is provided between the GGSN 722 and the HLR 724.

The CN 706 provides the interface from the UE domain 702 to external networks 726 such as the Internet 728 via a Gi interface from the GGSN 722, and other networks 730 via the GMSC 718, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 706 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Summarizing the UMTS frequencies, 1920-1980 MHz and 2110-2170 MHz are employed for FDD and WCDMA. Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz are for TDD and TD/CDMA. Unpaired channel spacing can be 5 MHz and raster is 200 kHz. Transmit and receive are not separated in frequency.

Frequencies 1980-2010 MHz and 2170-2200 MHz are employed for satellite uplink and downlink.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates validation of a mobile user, comprising:
   a memory;
   at least one processor communicatively coupled to the memory that facilitates execution of computer-executable instructions to at least:
   facilitate authenticated registration of the mobile user in response to Internet protocol security not being enabled at user equipment associated with the mobile user;
   store registered contact information to the memory, wherein the registered contact information includes a registered Internet protocol address allocated by a gateway general packet radio service support node,
   receive a request and validate the request based at least in part upon a comparison between the registered contact information and contact information associated with the mobile user included in the request,
   determine, in response to the Internet protocol security not being enabled at the user equipment, that a trusted network is to be requested to validate the request,
   determine that the trusted network exists in response to the trusted network being requested, and
   refuse the request in response to the trusted network not existing.

2. The system of claim 1, wherein the authenticated registration utilizes authentication and key agreement registration.

3. The system of claim 1, wherein the validation component is a proxy-call session control function server.

4. The system of claim 1, wherein the at least one processor further facilitates the execution of the computer-executable instructions to register an Internet protocol multimedia subsystem with the user equipment associated with the mobile user.

5. The system of claim 1, wherein the contact information associated with the mobile user is a contact Internet protocol address, and the at least one processor further facilitates the execution of the computer-executable instructions to compare the contact Internet protocol address to the registered Internet protocol address in order to validate the request.

6. The system of claim 1, wherein the contact information associated with the mobile user is a contact public user identity associated with a contact Internet protocol address, and the at least one processor further facilitates the execution of the computer-executable instructions to compare the contact public user identity to a registered public user identity that is associated with the registered Internet protocol address during authenticated registration.

7. The system of claim 5, wherein the at least one processor further facilitates the execution of the computer-executable instructions to service the request in response to the contact information associated with the mobile user matching the registered contact information.

8. The system of claim 5, wherein the at least one processor further facilitates the execution of the computer-executable instructions to reject the request by way of an error response in response to the contact information associated with the mobile user failing to match the registered contact information.

9. The system of claim 1, wherein at least some of the computer-executable instructions are associated with an Internet protocol multimedia subsystem.

10. The system of claim 1, wherein the registered contact information further includes a registered public user identity that is associated with the registered Internet protocol address during the authenticated registration.

11. A computer-implemented method of validating user equipment, comprising:
    performing, by a system including at least one processor, authentication registration of user equipment in response to Internet protocol security not being enabled at the user equipment;
    receiving a registered Internet protocol address allocated by a gateway general packet radio service support node;
    storing registered contact information in a network server;
    receiving a request for a network service;
    comparing contact information associated with the request to the registered contact information to obtain validation results;
    determining, in response to Internet protocol securing not being enabled at the user equipment, whether a trusted network is required for the validation results;
    determining, in response to the trusted network being required, whether the trusted network exists;
    including in the validation results an indication to refuse the request in response to the trusted network not existing; and
    processing the request based upon the validation results.

12. The method of claim 11, further comprising serving the request in response to the validation results being affirmative.

13. The method of claim 11, wherein the receiving the request includes receiving a dialog request.

14. The method of claim 11, further comprising rejecting the request in response to the validation results being negative.

15. The method of claim 14, wherein the processing the request includes rejecting the request by way of an error message.

16. The method of claim 11, wherein the storing the registered contact information in the network server includes storing the registered contact information in a proxy-call session control function server.

17. The method of claim 11, further comprising:
    determining that the user equipment does not support Internet protocol security;
    determining that a trusted network is required;
    determining that a network is not trusted; and
    refusing the request for the network service.

18. The method of claim 11, further comprising associating the registered Internet protocol address to a registered public user identity during the authentication registration.

19. A non-transitory computer readable storage medium comprising computer executable instructions that, in response to execution by a computing system, cause the computing system to perform operations, comprising:
    registering information associated with user equipment in response to Internet protocol security not being enabled at user equipment, wherein registered information includes a public user identity and is based upon an assignment of a registered Internet protocol address by a gateway general packet radio service support node prior to or during a registration authentication procedure;
    employing a computer memory for storing the registered information;
    receiving a request from the user equipment; and
    validating the request including:
       comparing the registered information with contact information associated with the request,
       determining whether a trusted network is required in response to Internet protocol securing not being enabled at the user equipment;
       determining whether the trusted network exists in response to the trusted network being required; and refusing the request in response to the trusted network being undetected.

20. The computer readable storage medium of claim 19, wherein the storing the registered information includes storing the registered information in a proxy-call session control function server.

21. The computer readable storage medium of claim 19, wherein the registering of the information associated with user equipment comprises authenticating the registration by way of authentication and key agreement.

* * * * *